No. 861,103. PATENTED JULY 23, 1907.
O. GAZEL.
SCALE FOR DIVIDING CIRCLES INTO EQUAL PARTS.
APPLICATION FILED DEC. 21, 1906.
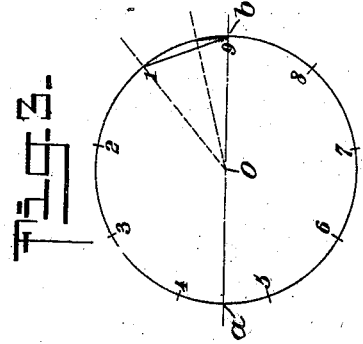
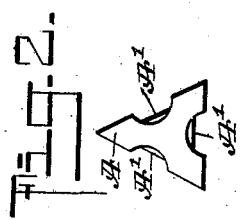
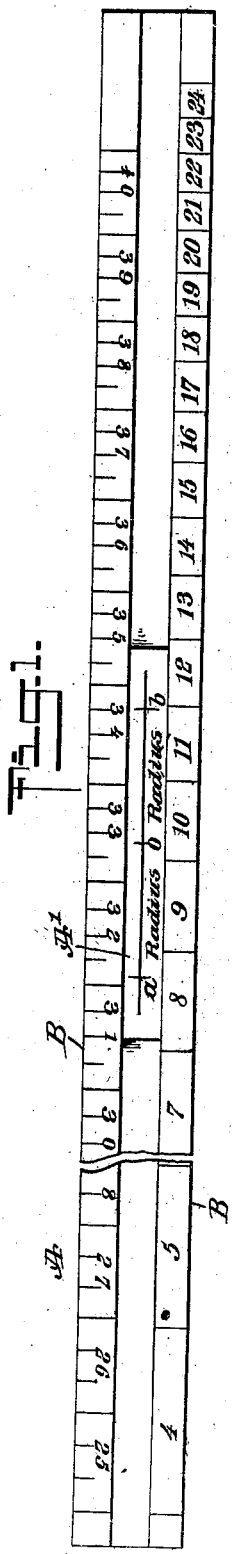
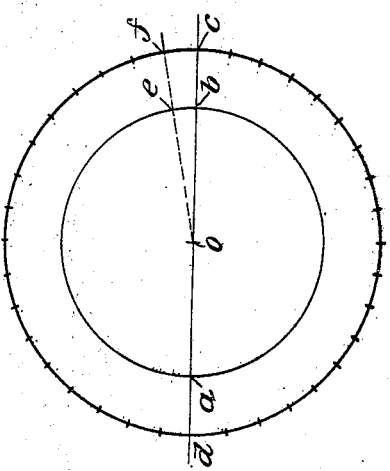
WITNESSES
INVENTOR
Oreste Gazel
BY
ATTORNEYS

UNITED STATES PATENT OFFICE.

ORESTE GAZEL, OF HABANA, CUBA.

SCALE FOR DIVIDING CIRCLES INTO EQUAL PARTS.

No. 861,103.      Specification of Letters Patent.      Patented July 23, 1907.

Application filed December 21, 1906. Serial No. 348,962.

*To all whom it may concern:*

Be it known that I, ORESTE GAZEL, a citizen of France, and a resident of Habana, Cuba, West Indies, have invented a new and Improved Scale for Dividing Circles into Equal Parts, of which the following is a full, clear, and exact description.

The invention relates to drafting and its object is to provide a new and improved scale for dividing circles into equal parts in a very simple and quick manner.
The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the scale; Fig. 2 is an end view of the same; Fig. 3 is a diagrammatic view of the standard circle used for obtaining the divisional parts of the scale, and Fig. 4 is a like view graphically illustrating the use of the scale.

The body A of the scale is made of wood, metal or other suitable material and is preferably triangular in cross section, as indicated in Fig. 2, and along each edge of the body A are arranged linear divisions B numbered consecutively, each division representing the side of a regular polygon having as many equal sides as indicated by the numeral of the division, the several polygons being inscribed in the same circle having as a center the point $o$, the diameter $a\ b$ or the radii $a\ o$, $b\ o$ marked on one of the sides of the body A, as plainly indicated in Fig. 1. Thus the circle shown in Fig. 3 is one from which all the divisions B for the scale shown in Fig. 1 are derived, and hence I prefer to call this circle the standard circle. Now in order to obtain the several linear divisions as marked on the scale, shown in Fig. 1, say, for instance, the division 9, it is only necessary to divide the standard circle into nine equal parts for inscribing a regular nine-sided polygon in the circle, any one side of the polygon corresponding to the division 9; or, in other words, a chord drawn from the point 9 to the next following point represents the division line in the scale. In a like manner the linear division 15 is obtained, that is, the standard circle shown in Fig. 3 is divided into fifteen equal parts for a fifteen-sided regular polygon, one side of which corresponds to the division 15. In this manner all the divisions of the scale are obtained,
the divisions of one scale body preferably running from 4 to 100, the divisions 4 to 24 being shown along the lower edge of the side of the scale body A illustrated in Fig. 1, the divisions 25 to 40 being shown along the upper edge of the said scale body, while the remaining divisions 41 to 100 (not shown) are arranged in a similar manner along the edges of the other side of the scale body A. Each linear division from 25 to 100 is preferably repeated several times under the same numeral, as indicated along the upper edge of the scale body shown in Fig. 1, so as to facilitate the perfect dividing of a circle into a large number of equal parts.

The scale is used as follows: Presuming that the outer circle shown in Fig. 4 having the diameter $c\ d$ and the center $o$ is to be divided into 36 equal parts, then the operator first inscribes the standard circle having the diameter $a\ b$ and the same center $o$ and then the distance $b\ e$ corresponding to the linear division 36 of the scale is stepped off on the standard circle from $b$ to $e$, after which the radius $o\ e$ is drawn and extended to include the outer circle at F. The distance $c\ f$ is one thirty-sixth part of the outer circle, and with a divider opened up to the distance $c\ f$ the outer circle can be quickly divided into thirty six equal parts.

It is understood that it is immaterial whether the circle to be divided into a number of equal parts is larger or smaller than the standard circle.

As illustrated in Figs. 1 and 2 the diameter of the standard circle and the center thereof are arranged on a flat portion A' at or near the middle of the body A, as plainly indicated in the said figures, and hence the user of the scale can readily draw the standard circle concentric with the one to be divided into a number of equal parts.

Having thus described my invention, I claim as new and desire to secure by Letters Patent:

A scale for dividing circles into equal parts, said scale being substantially triangular in cross section, and having each edge provided with consecutively numbered divisions, each numbered division representing the side of a regular polygon having as many equal sides as indicated by the number of the division, the faces of the scale being flattened intermediate the ends thereof, and having thereon a scale representing the radius of the standard circle in which the sides of the polygons were determined.

In testimony whereof I have signed my name to this specification in the presence of two subscribing witnesses.

ORESTE GAZEL.

Witnesses:
     MORRISS MARINE,
     HENLEY C. MEUZER.